May 23, 1939.　　A. W. PHELPS ET AL　　2,159,225
STEERING GEAR
Filed Oct. 15, 1937
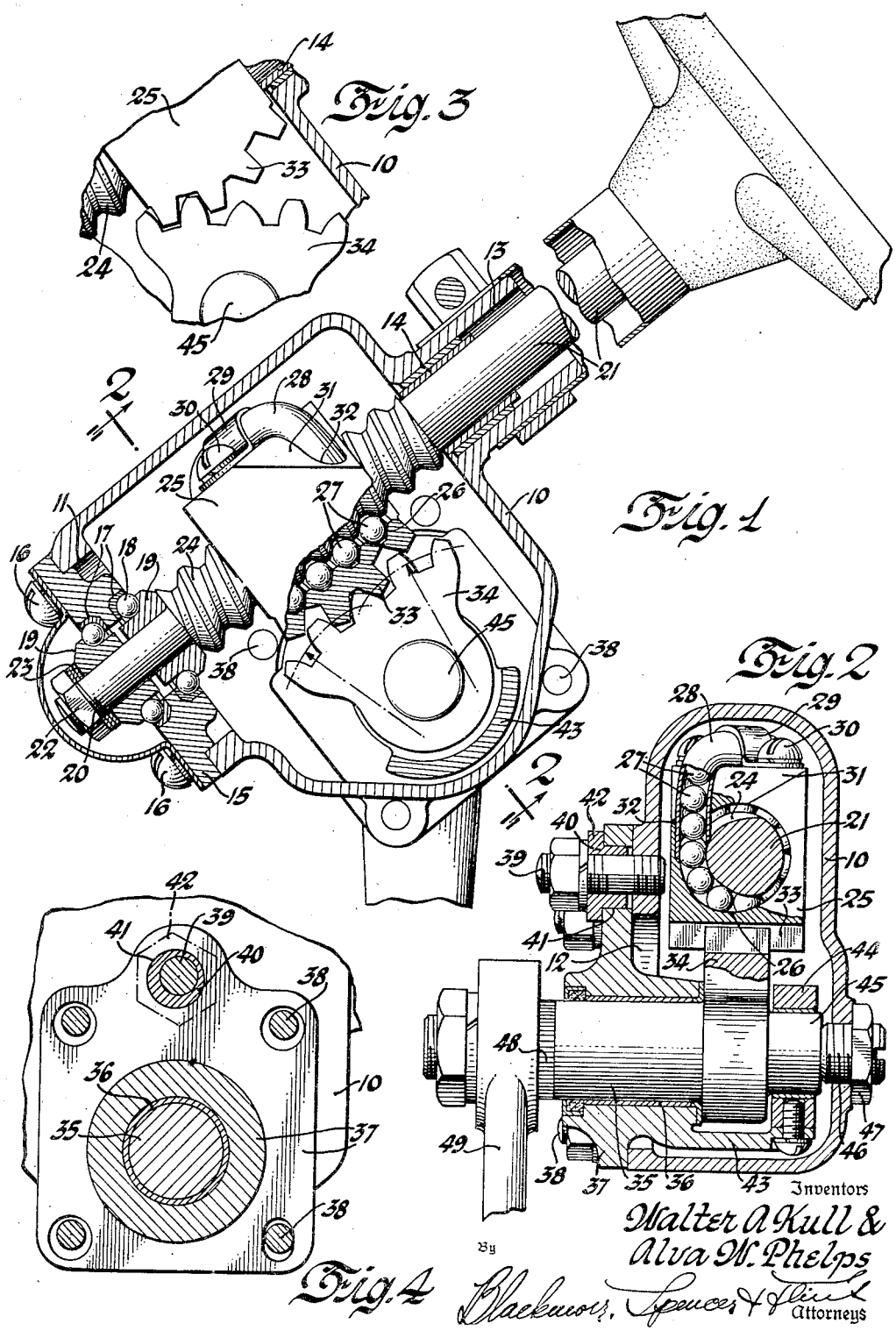
Inventors
Walter A Kull &
Alva W. Phelps
By Blackmore, Spencer & Flint
Attorneys Patented May 23, 1939

2,159,225

UNITED STATES PATENT OFFICE 2,159,225

STEERING GEAR

Alva W. Phelps and Walter A. Kull, Saginaw, Mich., assignors to General Motors Corporation, Detroit, Mich., a corporation of Delaware Application October 15, 1937, Serial No. 169,112

6 Claims. (Cl. 74—499)

The invention relates to improvements in steering gears, and more particularly to a gear in which a rotatable grooved shaft is fitted with a grooved nut, with balls running in the grooves to transmit oscillatory motion to a steering gear rock-shaft.

An object of the invention is to make a simple substantial gear at low cost.

Another object is to make a gear that will operate with a minimum amount of friction.

Another object is to make a gear that can be easily adjusted for back-lash.

Another object is to arrange a toothed nut and sector whereby a variable ratio may be used as the gear is turned to either side of mid-position.

With the above and other objects and advantages in view, the invention consists in the details of construction to be hereinafter more fully described and claimed and illustrated in the accompanying drawing, in which:

Figure 1 is a vertical sectional view of the gear with a part of the steering wheel and shaft connections shown broken away.

Figure 2 is a cross sectional view of the gear on the line 2—2 Figure 1.

Figure 3 is a broken-away detail showing the teeth of the gear nut and sector when moved to one extreme end position.

Figure 4 is an elevation view of the front cover plate for the gear showing an adjustable fastening means.

Referring more particularly to the drawing, in which like numerals of reference in the various figures refer to similar parts, there is shown a housing 10 having an opening 11 at the lower end thereof, an opening 12 at one side thereof and an opening 13 at the upper end thereof fitted with a suitable bearing bushing 14.

The lower opening 11 has an end cover 15 secured thereover by screws 16, and is recessed from opposite sides to receive cups 17 of opposed ball thrust bearings 18 having cone races 19 secured on a reduced end 20 of a steering gear shaft 21 by a nut 22. Spring washers 23 are interposed between the nut 22 and the outer bearing cone to pre-load the thrust bearing assembly.

The upper end of the steering shaft 21 is journalled in the bearing sleeve 14 so that it may move longitudinally to find its set position as defined by the double thrust bearings 18, which in turn are held in fixed position by the end cover 15.

The steering shaft 21 is formed with a helical groove 24 between the bearings 18 and 14, and a nut 25 having an internal helical groove 26 corresponding to the shaft groove 24 is floated thereon by balls 27 filling the adjacent grooves as shown.

Balls 27 are always retained in the grooves in the nut 25 by means of a transfer tube 28 clamped on to the nut by a clip 29 fastened to the top of the nut by screws 30, opposed corners of the nut being cut away on a bevel at 31 and drilled to form orifices 32 into which the ends of transfer tube 28 extend and are formed to fit the grooves in both the shaft and the nut whereby the balls when they reach either open end of the tube will be guided thereinto and continue therethrough according to the number of revolutions of shaft.

The general arrangement of grooved shaft and nut and transfer means is well known in the art, but it has been found that a steering wheel and its shaft will indicate, or as it is termed "telegraph" to the operator any roughness or irregularity in the operation of the shaft and nut, such as the balls turning a sharp corner which registers a clicking feel and sound at the wheel and in order to avoid this it is quite important that the transfer tube be arranged as more particularly shown in Figure 2, and the balls leave the grooves between the shaft and nut tangentially and pass into the tube without turning any sharp corners likewise in passing over the top, the corners of the nut are cut away and the tube curved as shown in both Figure 1 and Figure 2 to complete a closed cycloidal path for the balls, which gives a decidedly free and smooth feel to the steering gear when in use.

The underside of the nut 25 is formed with a toothed rack 33 curved in the direction of the shaft 24 and meshing with a complementary gear sector 34 formed on a rock-shaft 35 journalled in a bearing 36 in a cover plate 37 secured over the opening 12 of the gear housing as hereinafter more particularly described.

It will be noted from the foregoing description of the rack and sector gearing that the sector is substantially that of a bi-lobed symmetrical gear; that is, the teeth each side of the center tooth have a pitch circle eccentric to the rock-shaft and, as more particularly shown in Figure 3, the ratio between the rack and sector will change either side of center, and the movement of the nut will cause the sector to move more quickly in center position, and gradually reduce the ratio toward each end where it is considered advantageous in automobile steering.

The cover plate 37 is secured over the opening 12 by the stud bolts 38, three of which pass through larger sized holes in the cover plate as shown more particularly in Figure 4, while one lower stud passes through a vertical slot fitting the sides of the stud and a special top stud 39 has an eccentric bushing 40 fitting the orifice 41 and a hexagonal outer flange 42 whereby it may be turned to raise or lower the cover with the rock-shaft and sector in proper meshing position with the rack 33 before tightening the nuts on the stud bolts 38.

The cover plate 37 also has an inwardly extending shelf 43 supporting an inner bearing 44 for the inner end 45 of the rock-shaft, and a thrust-screw 46 is threaded through the housing 10, and abuts the inner end 45 of the rock-shaft to properly position the same longitudinally in the bearings 36 and 44 after which the thrust-screw is locked in position by the nut 47. The outer end 48 of the rock-shaft is shown fitted with the customary Pitman arm 49, though of course it will be understood that any other suitable means may be used to transmit the movement of the rock-shaft to the steering wheels of an automobile, as such parts form no part of the present invention.

From the foregoing description it will be understood that the steering gear shaft 21 will be quite free to rotate on the ball bearings 18 yet firmly held against longitudinal movement. Likewise when the sector 34 is adjusted properly against the curved rack 26, the nut 25 will be securely held against longitudinal movement by the balls 27 closely fitting the groove 26 in the nut and the groove 24 of the shaft 21 on the under side thereof, while permitting ample manufacturing tolerance between the opposed parts of the grooves as they pass the upper side.

The gear is inexpensive to make as the grooves are simple to cut, and the teeth of both rack and gear sector are straight and easily formed. The transfer tube 28 is readily placed in position and affords free passage for a sufficient number of balls between the steering shaft and the nut to assure long wear and a minimum of friction.

Although details of a preferred form of the invention are shown and described, it must not be limited to the same except as defined in the annexed claims.

We claim:

1. A steering gear comprising a housing, a helically grooved shaft member mounted for rotation within said housing, a nut on said shaft having a toothed outer side and having a helical internal groove with orifices adjacent each end leading tangentially from the groove to an outer side face of the nut, balls filling the opposed grooves on said shaft and said nut, a U-shaped tube extending diagonally across the top of the nut and having the ends insertable through the orifices in said nut and extending tangentially into the path of the balls in said opposed grooves, a rock-shaft and a gear sector secured to said rock-shaft and meshing with the toothed side of said nut.

2. In a steering gear or the like, a shaft having a helical groove, a nut surrounding said shaft and having an internal helical groove and orifices toward each end thereof tangential to said internal groove, a transfer tube substantially U-shaped clipped to and extending diagonally across the nut and having the ends inserted into said orifices and tangentially partway into the grooves between said shaft and said nut and balls filling said transfer tube and the space between the grooves between the ends of said tube.

3. A steering gear comprising a housing, a grooved shaft mounted in said housing, a grooved nut on said shaft, balls arranged between said shaft and said nut and supporting said nut clear of said housing, a rock-shaft operatively connected with said nut and adjustably mounted to move one side of said nut laterally with respect to said shaft to move the balls on that side into close running position with said shaft.

4. A steering gear comprising a housing, a threaded shaft rotatably supported in said housing, a nut fitting said shaft for longitudinal movement thereon and having a curved rack on one side thereof, a rock-shaft transversely mounted in said housing and a bi-lobed gear sector carried by said rock-shaft and formed complementary to said curved rack.

5. A steering gear comprising a housing, a grooved shaft mounted for rotation in said housing, a nut mounted for axial movement on said shaft and standing clear of said housing and having a toothed side face, a rock-shaft mounted in said housing, a single gear sector carried by said rock-shaft and engaging the toothed side of said nut to prevent rotation thereof on said shaft.

6. A steering gear comprising a housing having a front opening, a grooved shaft mounted for rotation in said housing, a nut mounted for axial movement on said shaft and standing clear of said housing and having a rack formed on the under side thereof, a cover plate secured over the opening in said housing and adjustable vertically toward said nut, a rock-shaft journalled in said cover plate and a single gear sector carried by said rock-shaft and meshing with the rack on said nut to prevent rotary movement thereof.

ALVA W. PHELPS.
WALTER A. KULL.